(12) United States Patent
Cho et al.

(10) Patent No.: US 12,511,738 B2
(45) Date of Patent: Dec. 30, 2025

(54) METHOD FOR PROVIDING INFORMATION ABOUT DIAGNOSIS OF GALLBLADDER POLYP AND DEVICE FOR PROVIDING INFORMATION ABOUT DIAGNOSIS OF GALLBLADDER POLYP USING SAME

(71) Applicants: INDUSTRY-ACADEMIC COOPERATION FOUNDATION, YONSEI UNIVERSITY, Seoul (KR); GACHON UNIVERSITY OF INDUSTRY-ACADEMIC COOPERATION FOUNDATION, Seongnam-si (KR); GIL MEDICAL CENTER, Incheon (KR)

(72) Inventors: Jae Hee Cho, Seoul (KR); Sung Ill Jang, Seoul (KR); Kwang Gi Kim, Incheon (KR); Young Jae Kim, Incheon (KR); Eui Joo Kim, Incheon (KR)

(73) Assignees: INDUSTRY-ACADEMIC COOPERATION FOUNDATION, YONSEI UNIVERSITY, Seoul (KR); GACHON UNIVERSITY OF INDUSTRY-ACADEMIC COOPERATION FOUNDATION, Seongnam-si (KR); GIL MEDICAL CENTER, Incheon (KR)

(*) Notice: Subject to any disclaimer, the term of this patent is extended or adjusted under 35 U.S.C. 154(b) by 422 days.

(21) Appl. No.: 18/017,402

(22) PCT Filed: Jul. 20, 2021

(86) PCT No.: PCT/KR2021/009346
§ 371 (c)(1),
(2) Date: Jan. 21, 2023

(87) PCT Pub. No.: WO2022/019616
PCT Pub. Date: Jan. 27, 2022

(65) Prior Publication Data
US 2023/0274421 A1    Aug. 31, 2023

(30) Foreign Application Priority Data

Jul. 22, 2020    (KR) .................. 10-2020-0090945

(51) Int. Cl.
G06T 7/00       (2017.01)
G06T 7/60       (2017.01)
G06V 10/764     (2022.01)

(52) U.S. Cl.
CPC .............. G06T 7/0012 (2013.01); G06T 7/60 (2013.01); G06V 10/764 (2022.01);
(Continued)

(58) Field of Classification Search
CPC .................... G06T 7/0012; G06T 7/60; G06T 2207/10068; G06T 2207/10132;
(Continued)

(56) References Cited

U.S. PATENT DOCUMENTS

2020/0069292 A1    3/2020  Abolmaesumi et al.
2020/0265275 A1*   8/2020  Dassopoulos .......... G16H 30/40
2023/0320566 A1*  10/2023  Miller ................ A61B 1/00137
                                                        382/128

FOREIGN PATENT DOCUMENTS

JP      2020-093095 A   6/2020
KR   10-2010-0059489 A   6/2010
(Continued)

OTHER PUBLICATIONS

Algorithmic approaches to the diagnosis of gallbladder intraluminal lesions on ultrasonography, C.-H. Wu et al. / Journal of the Chinese Medical Association 81 (2018) 297-304.
(Continued)

*Primary Examiner* — Matthew C Bella
*Assistant Examiner* — Andrew B. Jones
(74) *Attorney, Agent, or Firm* — INVENSTONE PATENT, LLC

(57) ABSTRACT

Provided are a method for providing information about the diagnosis of a gallbladder polyp and a device for providing information about the diagnosis of a gallbladder polyp using
(Continued)

same. The method for providing information about the diagnosis of a gallbladder polyp being implemented by a processor includes the steps of receiving an ultrasound medical image including a gallbladder part of a subject, determining the pathogenesis of a gallbladder polyp in the subject using a first assessment model configured to determine the pathogenesis of a gallbladder polyp on the basis of the ultrasound medical image, and determining characteristics of the gallbladder polyp on the basis of a second assessment model configured to classify characteristics of the gallbladder polyp when the gallbladder polyp is determined in the ultrasound medical image.

18 Claims, 13 Drawing Sheets

(52) U.S. Cl.
CPC .............. *G06T 2207/10068* (2013.01); *G06T 2207/10132* (2013.01); *G06T 2207/20081* (2013.01); *G06T 2207/20132* (2013.01); *G06T 2207/30092* (2013.01)

(58) Field of Classification Search
CPC . G06T 2207/20081; G06T 2207/20132; G06T 2207/30092; G06T 2207/10016; G06T 2207/20084; G06T 2207/30056; G06V 10/764; G06V 10/25; G06V 2201/032; A61B 8/00; A61B 8/08; A61B 8/5223; A61B 8/085; A61B 8/463; A61B 8/467; G16H 30/40; G16H 50/20
See application file for complete search history.

(56) References Cited

FOREIGN PATENT DOCUMENTS

| KR | 10-2014-0006466 A | 1/2014 |
| KR | 10-2016-0062819 A | 6/2016 |
| KR | 10-2018-0070990 A | 6/2018 |
| KR | 10-2020-0109093 A | 9/2020 |
| KR | 10-2022-0008424 A | 1/2022 |

OTHER PUBLICATIONS

Japanese Office Action dated Jan. 4, 2024 issued on Application No. 2023-504125.
Computer-aided diagnosis of gallbladder polyps based on high resolution ultrasonography.
Deep learning-based decision support system for the diagnosis of neoplastic gallbladder polyps on ultrasonography_Preliminary results.
Diagnostic performance of endoscopic ultrasound-artificial intelligence using deep learning analysis of gallbladder polypoid lesions.
Photoacoustic Imaging for Differential Diagnosis of Benign Polyps versus Malignant Polyps of the Gallbladder_A Preliminary Study.
Polypoid Lesions of the Gallbladder_Disease Spectrum with Pathologic Correlation.

* cited by examiner

| Characteristic | Overall | Gallbladder polyp | | Non-neoplastic GB polyp | Gallbladder stone |
| --- | --- | --- | --- | --- | --- |
| | | Neoplastic GB polyp | | | |
| AI construct cohort | | | | | |
| Patient number (image number) | 670 (1039) | 99 (145) | | 368 (691) | 203 (203) |
| Patient characteristic | | | | | |
| Age | 53.3 ± 13.8 | 56.5 ± 13.9 | | 51.2 ± 12.1 | 55.3 ± 16.0 |
| Sex (M/F) | 326/344 | 45/54 | | 192/176 | 89/114 |
| Lesion characteristic (image) | | | | | |
| Size (average ± standard deviation) | 11.4 ± 3.9 | 15.1 ± 4.2 | | 10.6 ± 3.1 | 11.1 ± 4.0 |
| Cholesterol polyp/adenomyomatosis/others | | | | 638/41/12 | |
| Adenocarcinoma polyp/ adenomatous polyp | | 50/95 | | | |
| Validation cohort | | | | | |
| Patient number (image number) | 83 (83) | 20 (20) | | 52 (52) | 11 (11) |
| Patient characteristic | | | | | |
| Age | 53.3 ± 13.3 | 61 ± 12.5 | | 49.8 ± 11.8 | 54.9 ± 15.9 |
| Sex (M/F) | 37/46 | 12/8 | | 18/34 | 5/6 |
| Lesion characteristic (image) | | | | | |
| Size (average ± standard deviation) | 11.8 ± 4.2 | 15.0 ± 4.1 | | 10.9 ± 3.6 | 10.2 ± 5.9 |
| Cholesterol polyp/adenomyomatosis/others | | | | 45/5/2 | |
| Adenocarcinoma polyp/ adenomatous polyp | | 9/11 | | | |

FIG. 5A

|  |  | Training | Validation | Assessment |
|---|---|---|---|---|
| First assessment model (Gallbladder polyp VS Gallbladder stone) | Sensitivity (%) | 99.3 | 99.1 | 96.3 |
| | Specificity (%) | 100 | 100 | 92.9 |
| | PPV (%) | 100 | 100 | 98.4 |
| | NPV (%) | 99.3 | 99.1 | 79.5 |
| | Accuracy (%) | 99.7 | 99.5 | 95.7 |
| | AUC (95% CI) | – | – | 0.990 (0.984–0.994) |
| Second assessment model (Non-neoplastic GB polyp VS Neoplastic GB polyp) | Sensitivity (%) | 98.2 | 98.5 | 77.8 |
| | Specificity (%) | 100 | 100 | 91.6 |
| | PPV (%) | 100 | 100 | 57.9 |
| | NPV (%) | 98.1 | 98.4 | 96.5 |
| | Accuracy (%) | 99.1 | 99.2 | 89.8 |
| | AUC (95% CI) | – | – | 0.891 (0.868–0.913) |
| Third assessment model (Adenocarcinoma GB polyp VS Adenomatous GB polyp) | Sensitivity (%) | 100 | 100 | 85.6 |
| | Specificity (%) | 100 | 100 | 75 |
| | PPV (%) | 100 | 100 | 87.4 |
| | NPV (%) | 100 | 100 | 82.1 |
| | Accuracy (%) | 100 | 100 | 0.910 |
| | AUC (95% CI) | – | – | 0.910 (0.819–0.999) |

FIG. 5B

|  |  | System for diagnosing gallbladder polyp according to various exemplary embodiments of present disclosure | Medical staffs | | | |
|---|---|---|---|---|---|---|
|  |  |  | Overall | Expert | Intermediate | Elementary |
| First assessment model | Sensitivity (%) | 98.4 | 74.7 | 90.9 | 69.7 | 63.6 |
|  | Specificity (%) | 45.8 | 97.9 | 97.9 | 100 | 95.8 |
|  | PPV (%) | 83.6 | 86.1 | 87.5 | 100 | 70.7 |
|  | NPV (%) | 90.9 | 96.2 | 98.6 | 95.6 | 94.5 |
|  | Accuracy (%) | 84.6 | 94.9 | 97 | 96 | 91.6 |
|  | AUC (95% CI) | 0.948 (0.932–0.964) |  |  |  |  |
| Second assessment model | Sensitivity (%) | 60.3 | 74.2 | 90.2 | 69.9 | 62.6 |
|  | Specificity (%) | 77.4 | 44.9 | 47.6 | 58.7 | 28.3 |
|  | PPV (%) | 36.2 | 75.4 | 80.9 | 80.4 | 64.9 |
|  | NPV (%) | 90.2 | 46.2 | 65.2 | 46.3 | 27 |
|  | Accuracy (%) | 74.4 | 65.3 | 77.5 | 66.7 | 51.4 |
|  | AUC (95% CI) | 0.691 (0.679–0.702) |  |  |  |  |
| Third assessment model | Sensitivity (%) | 65.3 | 51.8 | 61.1 | 66.7 | 27.8 |
|  | Specificity (%) | 60.6 | 21.8 | 20.9 | 36.1 | 8.3 |
|  | PPV (%) | 78.3 | 32.6 | 35.1 | 44.3 | 18.4 |
|  | NPV (%) | 44.4 | 40.3 | 50 | 57.4 | 13.4 |
|  | Accuracy (%) | 63.8 | 34.7 | 38.1 | 49.2 | 16.7 |
|  | AUC (95% CI) | 0.634 (0.569–0.700) |  |  |  |  |

FIG. 5C

METHOD FOR PROVIDING INFORMATION ABOUT DIAGNOSIS OF GALLBLADDER POLYP AND DEVICE FOR PROVIDING INFORMATION ABOUT DIAGNOSIS OF GALLBLADDER POLYP USING SAME

CROSS-REFERENCE TO RELATED APPLICATIONS

This application is a National Stage filing under 35 U.S.C. 371 of International Application No. PCT/KR2021/009346, filed on Jul. 20, 2021, which claims the benefit of earlier filing date and right of priority to Korean Application No. 10-2020-0090945, filed on Jul. 22, 2020 in the Korean Intellectual Property Office, the contents of which are all hereby incorporated by reference herein in their entirety.

BACKGROUND OF THE DISCLOSURE

Technical Field

The present disclosure relates to a method for providing information about the diagnosis of a gallbladder polyp and a device using the same, and more particularly, to a method and a device configured to predict a gallbladder polyp on the basis of an ultrasound medical image.

Background Art

Gallbladder polyps (GBs) refer to all types of masses or lumps that protrude into the lumen of the gallbladder, except for gallbladder stones, and may include various types and forms of lesions. At this time, the GB polyps may be classified into non-neoplastic GB polyps and neoplastic GB polyps.

More specifically, cholesterol polyps, which are the non-neoplastic GB polyps, may be formed more frequently than the neoplastic GB polyps. At this time, the non-neoplastic GB polyps are usually 10 mm or less in size and may be multiple. On the other hand, the neoplastic GB polyps may be classified into adenomas, which are benign tumors, and malignant polyps, and are usually single lesions and may have a size of 10 mm or more.

Meanwhile, the GB polyps can be diagnosed through abdominal ultrasonography. However, the abdominal ultrasound has limitations in distinguishing between neoplastic GB polyps and non-neoplastic GB polyps.

In particular, distinguishing between the two types of polyps may be a very important issue in selecting an appropriate treatment method.

As the accuracy of diagnosis is further required for the improvement of medical services, etc., development of a new diagnostic method capable of diagnosing and classifying the GB polyps with high accuracy is required.

The background art of the disclosure has been prepared to more facilitate understanding of the present disclosure. It should not be understood that the matters described in the background art of the disclosure exist as prior arts.

SUMMARY OF THE DISCLOSURE

As a method for overcoming the above-mentioned limitations, the use of contrast-enhanced ultrasound (CEUS) for the distinguishing between non-neoplastic GB polyps and neoplastic GB polyps has been applied.

At this time, the CEUS has improved the ability to distinguish between two types of GB polyps compared to a general abdominal ultrasound, but it has been shown that there is still a limit to distinguishing polyps smaller than 2 cm in size.

Meanwhile, in order to overcome these limitations, the present inventors of the present disclosure have provided high-resolution medical images in which an ultrasonogram (US) probe was mounted on a distal end of an endoscope, provided hypoechoic foci, hyperechoic spots, microcysts, and a doppler flow, and further applied an endoscopic ultrasound (EUS) having characteristics of complicated scoring systems to the diagnosis of gallbladder polyps.

At this time, the present inventors of the present disclosure have recognized that highly reliable diagnosis of non-neoplastic GB polyps and neoplastic GB polyps was enabled by the characteristics of the EUS.

Furthermore, the present inventors of the present disclosure intended to supplement the limitations and problems of a conventional system for the diagnosis of gallbladder polyps on the basis of an abdominal ultrasound by introducing an artificial intelligence algorithm-based system. Accordingly, the present inventors of the present disclosure could recognize that objective analysis of endoscopic ultrasound medical images was enabled regardless of the skill level of medical personnel.

More specifically, the present inventors of the present disclosure intended to apply a deep learning model configured to classify gallbladder polyps on the basis of endoscopic ultrasound medical images in a gallbladder polyp diagnosis system.

Particularly, the present inventors of the present disclosure intended to set a region of interest (ROI) including lesions and then crop and use the ROI, as a method for increasing the accuracy of classification for small polyps that are present in a very small part of a medical image in the learning of a deep learning model.

At this time, the present inventors of the present disclosure recognized that there was no information about a pixel size in the case of an endoscopic ultrasound medical image, and a scale bar displayed on the endoscopic ultrasound medical image might be used as a method for solve the problem.

As a result, the present inventors of the present disclosure could acquire an ROI image having a target size as an actual size per pixel might be estimated, and confirm that a system for the diagnosis of a gallbladder polyp might classify a gallbladder polyp with high accuracy by reflecting size information of a suspected lesion.

Furthermore, the present inventors of the present disclosure could construct the deep learning model to classify whether neoplastic polyps are adenomatous polyps or adenocarcinoma polyps through multiple procedures, not to classify gallbladder polyps by a single procedure.

Thus, the present inventors of the present disclosure could expect to improve the diagnostic accuracy of gallbladder polyps by providing detailed features such as polyp subtypes in diagnosing the gallbladder polyps.

The present inventors of the present disclosure might provide a new polyp diagnosis system to prevent medical staffs from misinterpreting the progress of gallbladder polyps due to inaccurate images, and expect to improve a workflow of medical staffs in an actual clinical practice.

Therefore, the assignment to be solved by the present disclosure is to provide a method for providing information about the diagnosis of a gallbladder polyp and a device using the same, the method configured to determine a lesion using a plurality of assessment models on the basis of a deep learning algorithm and classify the lesion with respect to a received ultrasound medical image.

The objects of the present disclosure are not limited to the aforementioned objects, and other objects, which are not mentioned above, will be apparent to those skilled in the art from the following description.

According to an exemplary embodiment of the present disclosure, there is provided a method for providing information about the diagnosis of a gallbladder polyp. The present method for providing the information is a method for providing information about the diagnosis of polyps implemented by a processor, and configured to include receiving an ultrasound medical image including a gallbladder part of a subject, determining the pathogenesis of a gallbladder polyp in the subject using a first assessment model configured to determine the pathogenesis of the gallbladder polyp based on the ultrasound medical image, and determining characteristics of the gallbladder polyp based on a second assessment model configured to classify characteristics of the gallbladder polyp, when the gallbladder polyp is determined in the ultrasound medical image.

According to the feature of the present disclosure, the determining of the pathogenesis of the gallbladder polyp of the subject may include determining gallbladder polyps or gallbladder stones using the first assessment model further trained to classify the gallbladder polyps or the gallbladder stones based on the ultrasound medical image.

According to another feature of the present disclosure, the determining of the characteristics of the gallbladder polyp may include determining non-neoplastic GB polyps or neoplastic GB polyps using the second assessment model further configured to classify the non-neoplastic GB polyps or the neoplastic GB polyps in a gallbladder polyp region.

According to yet another feature of the present disclosure, after the determining the characteristics of the gallbladder polyp, the method may further include determining adenocarcinoma GB polyps or adenomatous GB polyps using a third assessment model configured to classify the adenocarcinoma GB polyps or the adenomatous GB polyps in the neoplastic GB polyp region, when the neoplastic GB polyps are determined.

According to yet another feature of the present disclosure, after the receiving the ultrasound medical image, the method may further include determining a region of interest (ROI) with respect to the ultrasound medical image and cropping the ROI.

At this time, the determining of the pathogenesis of the gallbladder polyp of the subject may include determining the pathogenesis of the gallbladder polyp of the subject based on the ROI using the first assessment model.

According to yet another feature of the present disclosure, the ultrasound medical image may include a scale bar, and the cropping may include cropping the ROI at a predetermined level based on the scale bar.

According to yet another feature of the present disclosure, the cropping of the ROI at the predetermined level may include calculating a size per pixel based on the scale bar, determining a target size based on the size per pixel, and cropping the ROI based on the target size.

According to yet another feature of the present disclosure, the scale bar may include scales having a predetermined size. At this time, the calculating of the size per pixel may include determining an x-axial coordinate value for each of two scales selected from the scale bar of the ultrasound medical image, calculating a pixel distance based on the x-axial coordinate, and calculating the size per pixel based on the pixel distance and the predetermined size.

According to yet another feature of the present disclosure, the scale bar may include scales having a predetermined size. At this time, the calculating of the size per pixel may include cropping the scale bar in the ultrasound medical image, determining a position of the scale based on the scales of the cropped scale bar using a connected component algorithm, and calculating the size per pixel based on the position of the scale and the predetermined size.

According to yet another feature of the present disclosure, the ultrasound medical image may be an endoscopic ultrasound (EUS) medical image.

According to yet another feature of the present disclosure, the method may further include displaying and providing an ROI for the first assessment model on the ultrasound medical image while determining the pathogenesis of the gallbladder polyp, or displaying and providing an ROI for the second assessment model on the ultrasound medical image while classifying the characteristics of the gallbladder polyp.

According to another exemplary embodiment of the present disclosure, there is provided a device for providing information about the diagnosis of a gallbladder polyp. The device for providing the information may include a communication unit configured to receive an ultrasound medical image including a gallbladder part of a subject, and a processor coupled with the communication unit. At this time, the processor is configured to determine the pathogenesis of a gallbladder polyp in the subject using a first assessment model configured to determine the pathogenesis of the gallbladder polyp based on the ultrasound medical image, and determine characteristics of the gallbladder polyp based on a second assessment model configured to classify the characteristics of the gallbladder polyp, when the gallbladder polyp is determined in the ultrasound medical image.

According to a feature of the present disclosure, the processor may be configured to determine gallbladder polyps or gallbladder stones using the first assessment model further trained to classify the gallbladder polyps or the gallbladder stones based on the ultrasound medical image.

According to another feature of the present disclosure, the processor may be further configured to determine non-neoplastic GB polyps or neoplastic GB polyps using the second assessment model configured to classify the non-neoplastic GB polyps or the neoplastic GB polyps in a gallbladder polyp region.

According to yet another feature of the present disclosure, the processor may be further configured to determine adenocarcinoma GB polyps or adenomatous GB polyps using a third assessment model configured to classify the adenocarcinoma GB polyps or the adenomatous GB polyps in the neoplastic GB polyp region, when the neoplastic GB polyps are determined.

According to yet another feature of the present disclosure, the processor may be further configured to determine a region of interest (ROI) with respect to the ultrasound medical image, crop the ROI, and determine the pathogenesis of the gallbladder polyp of the subject based on the ROI using the first assessment model.

According to yet another feature of the present disclosure, the ultrasound medical image may include a scale bar, and the processor may be further configured to crop the ROI at a predetermined level based on the scale bar.

According to yet another feature of the present disclosure, the processor may be further configured to calculate a size per pixel based on the scale bar, determine a target size based on the size per pixel, and crop the ROI based on the target size.

According to yet another feature of the present disclosure, the scale bar may include scales having a predetermined size, and the processor may be further configured to determine an x-axial coordinate value for each of two scales selected from the scale bar of the ultrasound medical image, calculate a pixel distance based on the x-axial coordinate, and calculate the size per pixel based on the pixel distance and the predetermined size.

According to yet another feature of the present disclosure, the scale bar may include scales having a predetermined size, and the processor may be further configured to crop the scale bar in the ultrasound medical image, determine a position of the scale based on the scales of the cropped scale bar using a connected component algorithm, and calculate the size per pixel based on the position of the scale and the predetermined size.

According to yet another feature of the present disclosure, the ultrasound medical image may be an endoscopic ultrasound (EUS) medical image.

According to yet another feature of the present disclosure, the processor may be further configured to display and provide an ROI for the first assessment model on the ultrasound medical image while determining the pathogenesis of the gallbladder polyp, or display and provide an ROI for the second assessment model on the ultrasound medical image while classifying the characteristics of the gallbladder polyp.

Details of other exemplary embodiments will be included in the detailed description of the disclosure and the accompanying drawings.

According to the present disclosure, it is possible to provide an accurate diagnostic result for gallbladder polyps by providing a new system for diagnosing a gallbladder polyp configured to classify the characteristics of the gallbladder polyp together with the pathogenesis of the gallbladder polyp in the ultrasound medical image based on the deep learning model.

According to the present disclosure, it is possible to objectively analyze an endoscopic ultrasound medical image regardless of the skill level of medical personnel by providing the system for diagnosing the gallbladder polyp on the basis of the deep learning model.

Particularly, according to the present disclosure, the classification accuracy for small polyps that are present in a very small part in a medical image may be high by setting a region of interest (ROI) including a lesion in the learning of the deep learning model and then using a training data set cutting the ROI.

At this time, according to the present disclosure, it is possible to classify small-sized gallbladder polyps with high accuracy by providing the system for diagnosing the gallbladder polyp configured to use the scale bar displayed on the endoscopic ultrasound medical image, so that the ROI image having a target size may be acquired and the size information of the suspected lesion may be reflected.

In addition, according to the present disclosure, it is possible to provide detailed characteristics such as subtypes of the polyps in the diagnosis of the gallbladder polyp using a deep learning model configured to classify whether the neoplastic polyps are benign tumors or malignant polyps through a plurality of processes, not classifying the gallbladder polyps by a single process.

Thus, according to the present disclosure, it is possible to increase the diagnostic accuracy of gallbladder polyps.

Furthermore, according to the present disclosure, it is possible to prevent medical staffs from misinterpreting the progress of gallbladder polyps due to inaccurate images and improve a workflow of medical staffs in an actual clinical practice by providing a polyp diagnosis system on the basis of the deep learning model.

The effects of the present disclosure are not limited by the foregoing, and other various effects are anticipated herein.

BRIEF DESCRIPTION OF THE DRAWINGS

FIG. 5A is a diagram illustrating training and assessment data of assessment models used in various exemplary embodiments of the present disclosure.

FIG. 5B to 5E are diagrams illustrating assessment results of the assessment models used in various exemplary embodiments of the present disclosure.

DETAILED DESCRIPTION OF THE DISCLOSURE

Figure 1A:
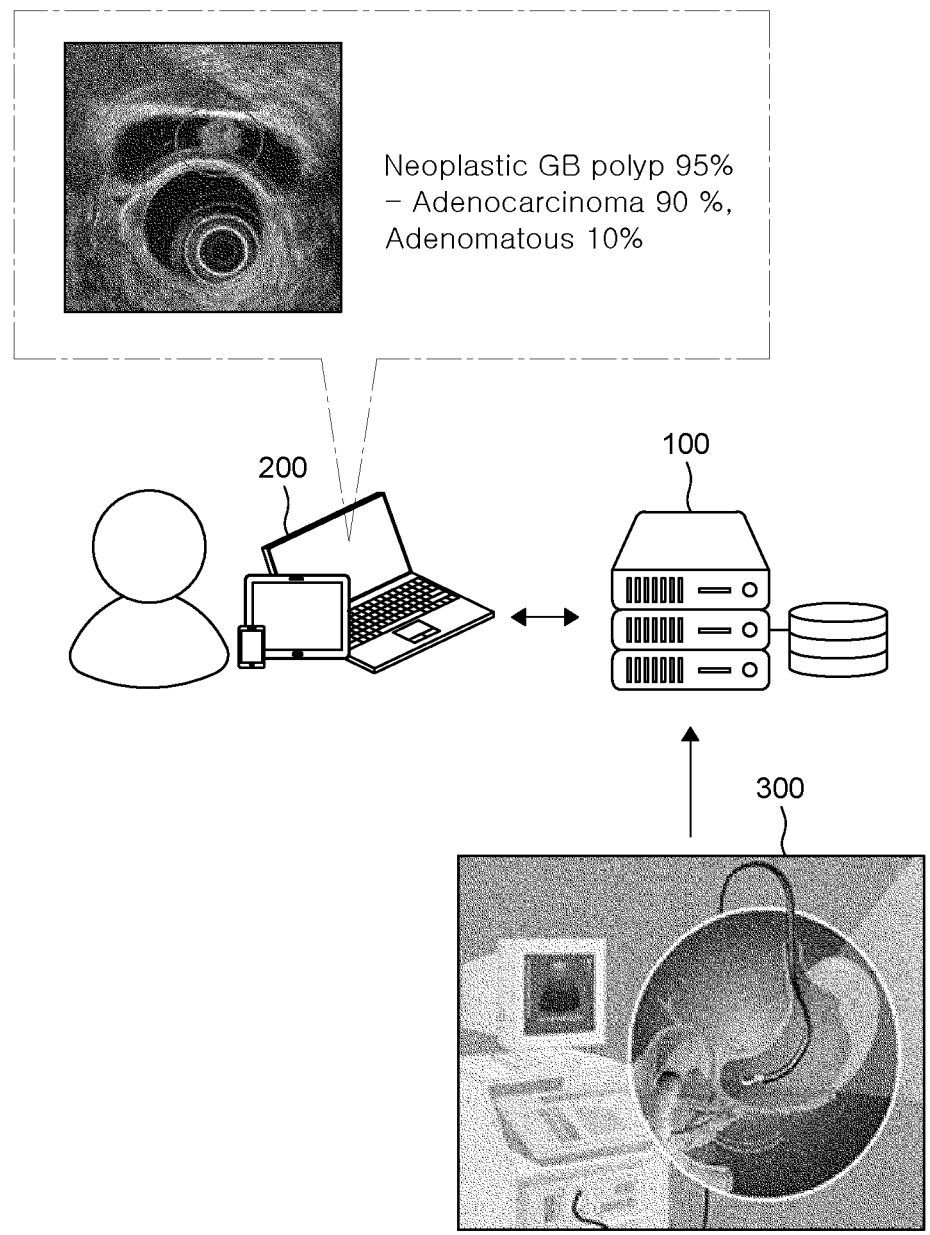
FIG. 1A is a diagram exemplarily illustrating a system for diagnosing a gallbladder polyp on the basis of a device for providing information about the diagnosis of a gallbladder polyp according to an exemplary embodiment of the present disclosure.

Advantages and features of the present disclosure, and methods for accomplishing the same will be more clearly understood from exemplary embodiments to be described below in detail with reference to the accompanying drawings. However, the present disclosure is not limited to the exemplary embodiments set forth below, and will be embodied in various different forms. The exemplary embodiments are just for rendering the disclosure of the present disclosure complete and are set forth to provide a complete understanding of the scope of the disclosure to a person with ordinary skill in the art to which the present disclosure pertains, and the present disclosure will only be defined by the scope of the claims. In connection with the description of the drawings, like reference numerals may be used for like components.

In the present disclosure, the expression such as "have", "may have", "comprise", "may comprise" or the like indicates the presence of the corresponding feature (e.g., components such as figures, functions, operations, or parts) and does not exclude the presence of an additional feature.

In the present disclosure, the expression such as "A or B", "at least one of A and/or B", or "one or more of A and/or B"

may include all possible combinations of items listed together. For example, "A or B", "at least one of A and B", or "at least one of A or B" may refer to all cases of (1) including at least one A, (2) including at least one B, or (3) including both at least one A and at least one B.

Expressions such as "first," and "second," used herein may modify various components regardless of the order and/or importance, and will be used only to distinguish one component from the other component, but are not limit the corresponding components. For example, a first user device and a second user device may represent different user devices, regardless of the order or importance. For example, a first component may be referred to as a second component, and similarly, the second component may also be referred to as the first component without departing from the scope of the present disclosure.

When a certain component (e.g., a first component) is referred to as being "(operatively or communicatively) coupled with/to" or "connected to" to the other component (e.g., a second component), it will be understood that the component may be directly connected to the other component, or may be connected to the other component through another component (e.g., a third component). On the other hand, when a certain component (e.g., a first component) is referred to as being "directly coupled with/to" or "directly connected to" to the other component (e.g., a second component), it will be understood that no other component (e.g., a third component) exists between the certain component and the other component.

The expression of "configured to" used herein may be changed and used to, for example, "suitable for", "having the capacity to", "designed to", "adapted to", "made to" or "capable of", depending on the situation. The term of "configured to" may not necessarily mean "specially designed to" in hardware. Instead, in some situations, the expression "a device configured to" may mean that the device "capable of" together with other devices or parts. For example, the phrase "a processor configured to perform A, B, and C" may mean a dedicated processor (e.g., an embedded processor) for performing the corresponding operation, or a generic-purpose processor (e.g., a CPU or application processor) capable of performing the corresponding operations by executing one or more software programs stored in a memory device.

The terms used herein are used to illustrate only specific exemplary embodiments, and may not be intended to limit the scope of other exemplary embodiments. A singular form may include a plural form unless otherwise clearly meant in the contexts. The terms used herein, including technical or scientific terms, may have the same meaning as generally understood by those of ordinary skill in the art described in the present disclosure. The terms defined in a general dictionary among the terms used herein may be interpreted in the same or similar meaning as or to the meaning on the context of the related art, and will not be interpreted as an ideal or excessively formal meaning unless otherwise defined in the present disclosure. In some cases, even the terms defined in the present disclosure cannot be interpreted to exclude the exemplary embodiments of the present disclosure.

The features of various exemplary embodiments of the present disclosure can be partially or entirely coupled or combined with each other and can be interlocked and operated in technically various ways to be sufficiently appreciated by those skilled in the art, and the exemplary embodiments can be implemented independently of or in association with each other.

For the clarity of the interpretation of the present disclosure, hereinafter, the terms used in the present disclosure will be defined.

As used herein, the term "subject" may refer to any subject of which gallbladder polyps are to be predicted. For example, a subject may be a subject suspected of gallbladder polyps. At this time, the subject disclosed in this specification may be any mammal except for humans, but is not limited thereto.

As used herein, the term "ultrasound medical image" may refer to an ultrasound medical image acquired from an ultrasound diagnosis device. In this case, the ultrasound medical image may be a medical image including a gallbladder region. Preferably, the ultrasound medical image may be an endoscopic ultrasound medical image including the gallbladder acquired from an endoscopic ultrasound (EUS) diagnosis device, but is not limited thereto. In this case, the format of the endoscopic ultrasound medical image may be dicom, jpeg, bitmap, png, or tiff, but is not limited thereto.

Meanwhile, the ultrasound medical image may be an endoscopic ultrasound moving image consisting of a plurality of cuts. In this case, the lesion may also be determined for each frame of the moving image according to a method for providing information about the diagnosis of a gallbladder polyp according to an exemplary embodiment of the present disclosure. As a result, the present disclosure may provide a streaming service by predicting a lesion simultaneously while receiving an endoscopic ultrasound medical image from an image diagnosis device such as an endoscopic ultrasound and also provide diagnosis information of the gallbladder polyp in real time.

According to a feature of the present disclosure, the ultrasound medical image may be a 2D image or a 3D image.

As used herein, the term "first assessment model" may be a model configured to output whether the gallbladder polyp is formed by inputting the ultrasound medical image.

More specifically, the first assessment model may be a model trained to classify whether a region of interest (ROI) is gallbladder polyps or gallbladder stones by inputting the ROI corresponding to a suspected polyp region in the ultrasound medical image.

In this case, when the ROI is not determined by the first assessment model, the corresponding ultrasound medical image may be a medical image of a normal object. That is, the first assessment model may be configured to classify normal or gallbladder polyps or gallbladder stones.

Meanwhile, the term "ROI" as used herein may mean a region suspected of the gallbladder polyps, a region including the gallbladder polyp region, or a region of interest determined in a classification process of the assessment model.

In this case, the ROI may be cropped in a predetermined size, for example, size of 20×20 mm or 196×196 pixels, to be input to the first assessment model. That is, the first assessment model may classify very small polyps with high accuracy using the cropped ROI.

Meanwhile, the predetermined size is not limited thereto, and may be set in various ranges according to a size of polyps to be detected and a type of endoscopic ultrasound diagnostic device.

Meanwhile, the gallbladder polyps may be classified into neoplastic GB polyps and non-neoplastic GB polyps.

As used herein, the term "second assessment model" may be a model configured to classify and output characteristics of the gallbladder polyp by inputting the ultrasound medical image when the gallbladder polyp is determined.

More specifically, the second assessment model may be a model trained to classify whether the gallbladder polyps are neoplastic GB polyps or non-neoplastic GB polyps by inputting the ROI determined as the gallbladder polyps.

At this time, the neoplastic GB polyps may be classified into adenomatous GB polyps and adenocarcinoma GB polyps.

As used herein, the term "third assessment model" may be a model configured to classify the characteristics of the neoplastic GB polyps by inputting the ultrasound medical image when the neoplastic GB polyps are determined.

More specifically, the third assessment model may be a model trained to classify whether the neoplastic GB polyps are adenomatous GB polyps or adenocarcinoma GB polyps by inputting the ROI determined as the neoplastic GB polyps.

Meanwhile, the adenomatous GB polyps may be used interchangeably with adenoma GB polyps, benign GB polyps, or benign polyps within the present specification.

Furthermore, the adenocarcinoma GB polyps may be used interchangeably with adenocarcinoma GB polyps, malignant GB polyps, or malignant polyps within the present specification.

Meanwhile, the system for diagnosing the gallbladder polyp according to various exemplary embodiment of the present disclosure may be configured to finally classify the characteristics of the neoplastic GB polyps using the first assessment model, the second assessment model, and the third assessment model sequentially, but is not limited thereto.

For example, in the system for diagnosing the gallbladder polyp according to various exemplary embodiments of the present disclosure, a single assessment model or various combinations of assessment models may be used.

That is, the system for diagnosing the gallbladder polyp according to various exemplary embodiments of the present disclosure may provide highly reliable diagnostic results for gallbladder polyps, particularly small-sized gallbladder polyps using three assessment models on the basis of a deep learning algorithm.

In particular, assessment models used in various exemplary embodiments of the present disclosure may be further configured to provide a class activation map (CAM) in which a feature map of the last layer is visualized. Accordingly, it may be easy to identify a region suspected of a lesion region.

Meanwhile, the assessment models according to various exemplary embodiments of the present disclosure may be Resnet50, but are not limited thereto. For example, the assessment models may be a fully convolutional network (FCN) having VGG net, R, DenseNet, and an encoder-decoder structure, a deep neural network (DNN) such as SegNet, DeconvNet, DeepLAB V3+, and U-net, and at least one algorithm selected from SqueezeNet, Alexnet, ResNet18, MobileNet-v2, GoogLeNet, Resnet-v2, Resnet50, Resnet101, and Inception-v3. Furthermore, the assessment models may be an ensemble model based on at least two algorithm models among the aforementioned algorithms.

Hereinafter, a system for diagnosing a gallbladder polyp on the basis of a device for providing information about the diagnosis of a gallbladder polyp according to an exemplary embodiment of the present disclosure will be described with reference to FIGS. 1A to 1C.

FIG. 1A is a diagram exemplarily illustrating a system for diagnosing a gallbladder polyp on the basis of a device for providing information about the diagnosis of a gallbladder polyp according to an exemplary embodiment of the present disclosure. FIG. 1B is a diagram exemplarily illustrating a configuration of a device for providing information about the diagnosis of a gallbladder polyp according to an exemplary embodiment of the present disclosure. FIG. 1C is a diagram exemplarily illustrating a configuration of a medical staff device for receiving and outputting information about a gallbladder polyp from a device for providing information about the diagnosis of a gallbladder polyp according to an exemplary embodiment of the present disclosure.

First, referring to FIG. 1A, a system 1000 for diagnosing a gallbladder polyp may be a system configured to provide information about the gallbladder polyp on the basis of an endoscopic ultrasound medical image of a subject. At this time, the system 1000 for diagnosing the gallbladder polyp may be configured by a device 100 for providing information about the diagnosis of the gallbladder polyp configured to determine the pathogenesis of a gallbladder disease for a subject on the basis of the endoscopic ultrasound medical image, a medical staff device 200 for receiving the information about the diagnosis of the gallbladder polyp, and an endoscopic ultrasound diagnosis device 300 for providing the endoscopic ultrasound medical image.

First, the device 100 for providing the information about the diagnosis of the gallbladder polyp may include a general purpose computer, a laptop computer, and/or a data server that perform various calculations to diagnose the pathogenesis of a gallbladder disease on the basis of the endoscopic ultrasound medical image of the user provided from the endoscopic ultrasound diagnosis device 300. At this time, the medical staff device 200 may be a device for accessing a web server providing a web page or a mobile web server providing a mobile web site with respect to the gallbladder polyps, but is not limited thereto.

More specifically, the device 100 for providing the information about the diagnosis of the gallbladder polyp may receive the endoscopic ultrasound medical image from the endoscopic ultrasound diagnosis device 300, and provide information related to the pathogenesis of the gallbladder disease from the received endoscopic ultrasound medical image. At this time, the endoscopic ultrasound diagnosis device 300 may use a plurality of assessment models and may perform stepwise assessment on the basis of each model.

The device 100 for providing the information about the diagnosis of the gallbladder polyp may provide data related to the pathogenesis of the gallbladder disease for the subject to the medical staff device 200.

As such, the data provided from the device 100 for providing the information about the diagnosis of the gallbladder polyp may be provided as a web page through a web browser installed in the medical staff device 200, or may be provided in the form of an application or program. In various exemplary embodiments, such data may be provided in a form included in a platform in a client-server environment.

Next, the medical staff device 200 is an electronic device that requests provision of information about the pathogenesis of the gallbladder disease for the subject and provides a user interface for displaying diagnosis result data, and may include at least one of a smart phone, a tablet personal computer (PC), a laptop computer, and/or a PC.

The medical staff device 200 may receive a diagnosis result on the pathogenesis of the gallbladder disease for the subject from the device 100 for providing the information about the diagnosis of the gallbladder polyp, and display the received result through a display unit. Here, the diagnosis result may include an ROI predicted in a process of classifying the lesion by the assessment models, a type of lesion (e.g., normal, gallbladder stones, gallbladder polyps, neoplastic gallbladder polyps, non-neoplastic GB polyps, adenomatous GB polyps, or adenocarcinoma GB polyps), and the like.

Meanwhile, without being limited to the exemplary embodiments, all steps for providing the information about the pathogenesis of the gallbladder disease for the subject may also be performed by the endoscopic ultrasound diagnosis device 300.

Next, referring to FIG. 1B, components of the device 100 for providing the information about the diagnosis of the gallbladder polyp of the present disclosure will be described in detail.

Figure 1B:
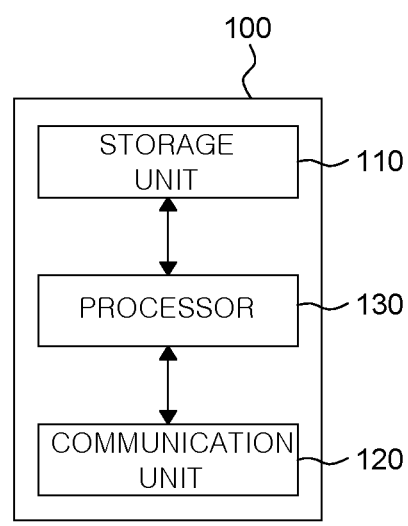
FIG. 1B is a diagram exemplarily illustrating a configuration of a device for providing information about the diagnosis of a gallbladder polyp according to an exemplary embodiment of the present disclosure.

Referring to FIG. 1B, the device 100 for providing the information about the diagnosis of the gallbladder polyp includes a storage unit 110, a communication unit 120, and a processor 130.

First, the storage unit 110 may store various data generated while diagnosing the pathogenesis of the gallbladder disease for the subject. For example, the storage unit 110 may be configured to store an image including the ROI determined to have a high contribution to classification or as a polyp suspected region in the process of classifying the first assessment model, the second assessment model and the third assessment model, and store the cropped image on the basis of the ROI. In various exemplary embodiments, the storage unit 110 may include at least one type of storage medium of a flash memory type, a hard disk type, a multimedia card micro type, a card type memory (e.g., SD or XD memory), a RAM, an SRAM, a ROM, an EEPROM, a PROM, a magnetic memory, a magnetic disk, and an optical disk.

The communication unit 120 connects the device 100 for providing the information about the diagnosis of the gallbladder polyp to be communicable with an external device. The communication unit 120 may be coupled to the medical staff device 200 and furthermore the endoscopic ultrasound diagnosis device 300 using wired/wireless communication to transmit/receive various data. Specifically, the communication unit 120 may receive the endoscopic ultrasound medical image of the subject from the endoscopic ultrasound diagnosis device 300. For example, the communication unit 120 may receive an endoscopic gallbladder ultrasound (moving) image for a subject from the endoscopic ultrasound diagnosis device 300. Furthermore, the communication unit 120 may transmit a diagnosis result to the medical staff device 200.

The processor 130 is operatively coupled to the storage unit 110 and the communication unit 120, and may execute various commands for analyzing the endoscopic ultrasound medical image for the subject.

Specifically, the processor 130 may be configured to determine the pathogenesis of the gallbladder polyp on the basis of the endoscopic ultrasound medical image received through the communication unit 120 and classify its characteristics.

At this time, the processor 130 may be on the basis of a first assessment model configured to determine the pathogenesis of the gallbladder polyp on the basis of the endoscopic ultrasound medical image, and/or a second assessment model configured to classify characteristics of the gallbladder polyp when the gallbladder polyp is present in the ultrasound medical image, and/or a third assessment model configured to classify characteristics of a neoplastic GB polyp when the neoplastic GB polyp is determined.

Meanwhile, the processor 130 may be configured to crop the ROI to a predetermined level on the basis of a scale bar in order to increase the accuracy of diagnosing the gallbladder polyp. The cropped ROI may be input to each assessment model.

More specifically, the processor 130 may be further configured to calculate a size per pixel on the basis of the scale bar, determine a target size on the basis of the size per pixel, and crop the ROI on the basis of the target size. Accordingly, the processor 130 may classify the characteristics by reflecting the size information of the gallbladder polyp. Moreover, the processor 130 may also determine the size of the polyp in the endoscopic ultrasound medical image.

Furthermore, the processor 130 may also be configured to display an ROI for the first assessment model on the ultrasound medical image while determining the pathogenesis of the gallbladder polyp, or to display an ROI for the second assessment model on the ultrasound medical image while classifying the characteristics of the gallbladder polyp.

Meanwhile, the device 100 for providing the information about the diagnosis of the gallbladder polyp is not limited to being designed in hardware. For example, the processor 130 of the device 100 for providing the information about the diagnosis of the gallbladder polyp may be implemented in software. Accordingly, a diagnosis result for the gallbladder polyp may also be displayed through the display unit of the endoscopic ultrasound diagnosis device 300 to which the software is coupled.

Figure 1C:
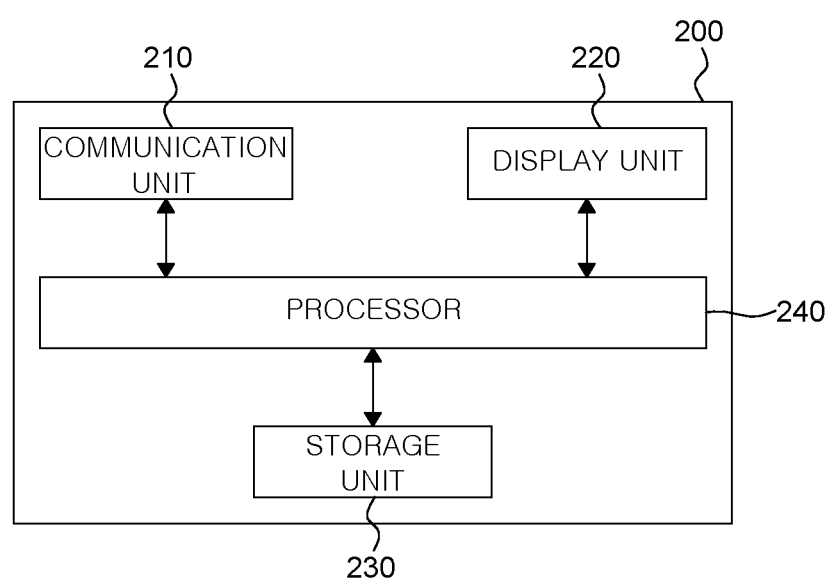
FIG. 1C is a diagram exemplarily illustrating a configuration of a medical staff device for receiving and outputting information about a gallbladder polyp from a device for providing information about the diagnosis of a gallbladder polyp according to an exemplary embodiment of the present disclosure.

Meanwhile, referring to FIG. 1C, the medical staff device 200 includes a communication unit 210, a display unit 220, a storage unit 230, and a processor 240.

The communication unit 210 may be configured to allow the medical staff device 200 to communicate with an external device. The communication unit 210 may be coupled to the device 100 for providing the information about the diagnosis of the gallbladder polyp using wired/wireless communication to transmit various data related to the diagnosis of the gallbladder polyp. Specifically, the communication unit 210 may determine a diagnosis result related to the diagnosis of the gallbladder polyp of the subject from the device 100 for providing the information about the diagnosis of the gallbladder polyp, for example, whether the subject is normal, or assess and determine whether gallbladder stones, gallbladder polyps, neoplastic GB polyps, non-neoplastic GB polyps, adenomatous GB polyps, or adenocarcinoma GB polyps are formed. Meanwhile, the communication unit 210 may receive visual information about an ROI determined in the process of predicting a lesion and the like. The information may be displayed and provided on the endoscopic ultrasound medical image, but is not limited thereto.

The display unit 220 may display various interface screens for displaying diagnosis results related to the diagnosis of the gallbladder polyp of the subject. For example, the display unit 220 may probabilistically display and provide whether the subject is normal or whether there is a risk of the pathogenesis of gallbladder stones, gallbladder polyps, neoplastic GB polyps, non-neoplastic GB polyps, adenomatous GB polyps, or adenocarcinoma GB polyps, and may also display and provide a suspected region in the endoscopic ultrasound medical image. Furthermore, the display unit 220 may output the size of the gallbladder polyp.

In various exemplary embodiments, the display unit 220 may include a touch screen, and may receive, for example, touch, gesture, approach, drag, swipe or hovering inputs, using an electronic pen or a part of the body of the user.

The storage unit 230 may store various data used to provide a user interface for displaying the result data. In various exemplary embodiments, the storage unit 230 may include at least one type of storage medium of a flash memory type storage medium, a hard disk type storage medium, a multimedia card micro type storage medium, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The processor 240 is operatively coupled to the communication unit 210, the display unit 220, and the storage unit 230, and may perform various commands to provide a user interface for displaying result data.

Figure 2A:
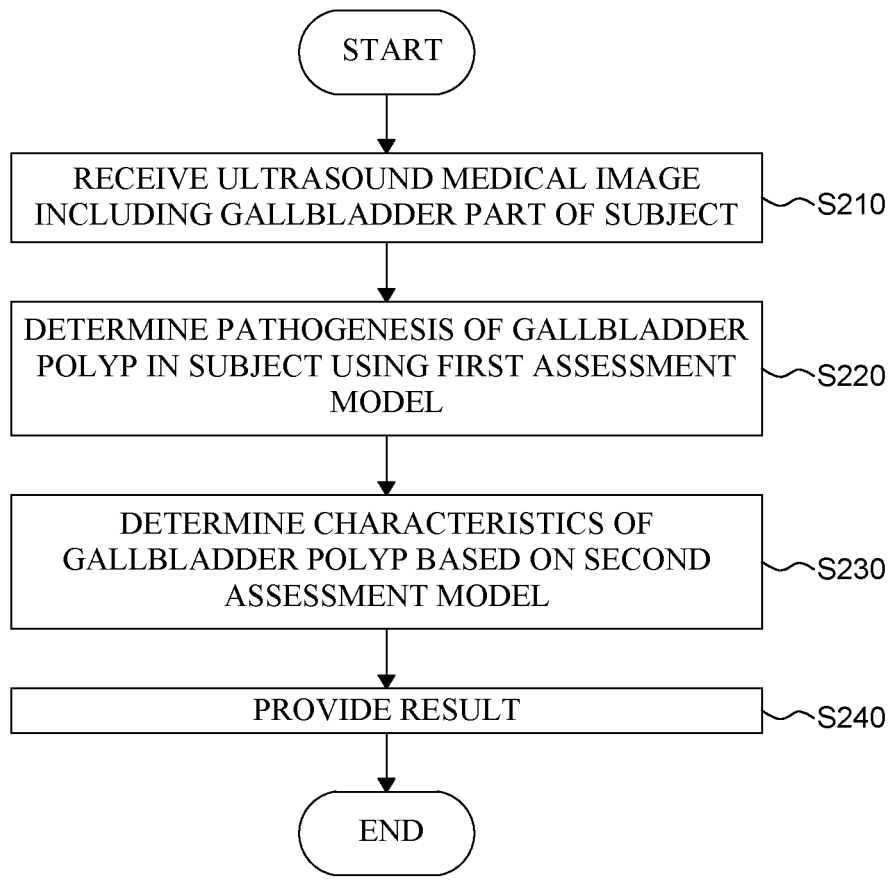
FIGS. 2A and 2B are diagrams exemplarily illustrating a process of a method for providing information about the diagnosis of a gallbladder polyp according to an exemplary embodiment of the present disclosure.
Figure 2B:
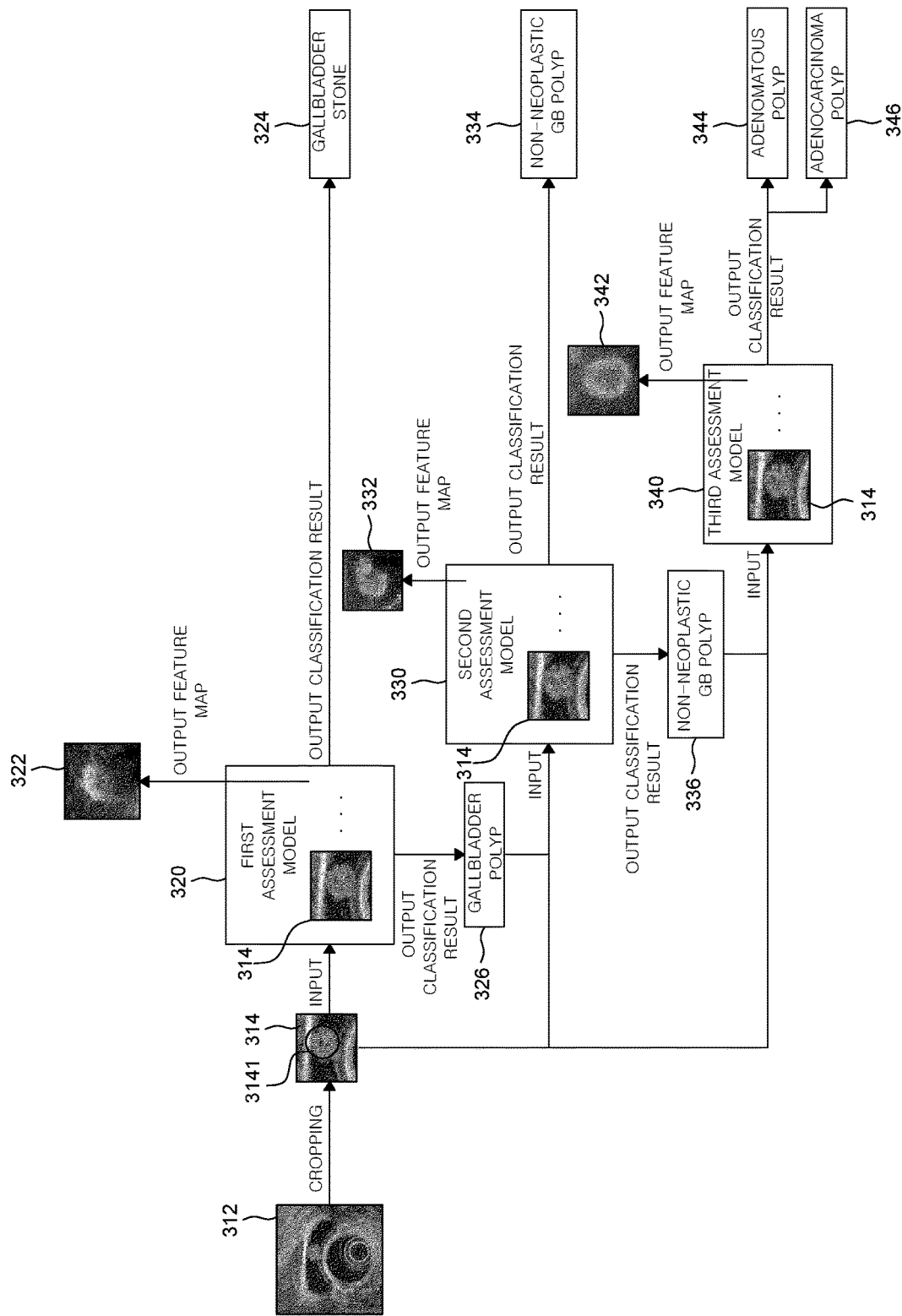
Figure 3A:
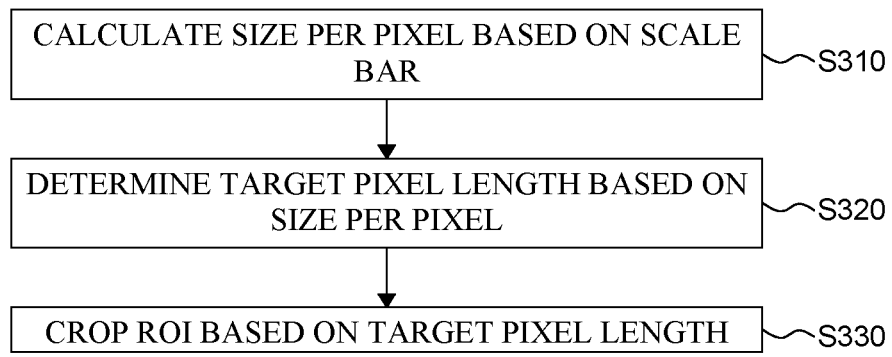
FIGS. 3A and 3B are diagrams exemplarily illustrating a process of cropping an ROI according to a method for providing information about the diagnosis of a gallbladder polyp according to an exemplary embodiment of the present disclosure.
Figure 3B:
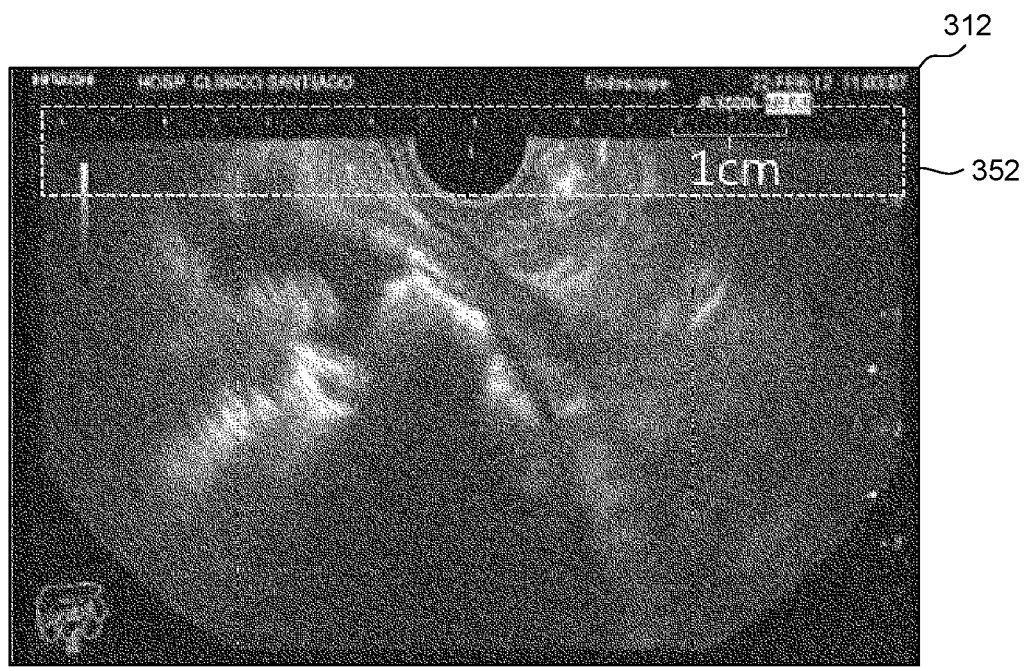

Hereinafter, a method for providing information about the diagnosis of a gallbladder polyp according to an exemplary embodiment of the present disclosure will be described in detail with reference to FIGS. 2A and 2B and FIGS. 3A and 3B. FIGS. 2A and 2B are diagrams exemplarily illustrating a process of a method for providing information about the diagnosis of a gallbladder polyp according to an exemplary embodiment of the present disclosure. FIGS. 3A and 3B are diagrams exemplarily illustrating a process of cropping an ROI according to a method for providing information about the diagnosis of a gallbladder polyp according to an exemplary embodiment of the present disclosure.

First, referring to FIG. 2A, a procedure for diagnosing the gallbladder polyp according to an exemplary embodiment of the present disclosure is as follows. First, the ultrasound medical image of the subject is received at step S210. Then, the pathogenesis of the gallbladder polyp of the subject is determined on the basis of the ultrasound medical image by a first assessment model at step S220. Next, the characteristics of the gallbladder polyp are determined by a second assessment model at step S230, and finally, a diagnosis result is provided at step S240.

More specifically, in the receiving of the ultrasound medical image at step S210, an endoscopic ultrasound medical image or an ultrasound medical image such as an ultrasound moving image may be received. In this case, the ultrasound medical image may include the gallbladder and a polyp suspected region in the gallbladder.

According to an exemplary embodiment of the present disclosure, in the receiving of the ultrasound medical image at step S210, the endoscopic ultrasound diagnosis device is driven to acquire an endoscopic ultrasound medical image captured in real time.

Next, in the determining of the pathogenesis of the gallbladder polyp at step S220, the first assessment model configured to output the normal or the pathogenesis of gallbladder polyps or gallbladder stones by inputting the endoscopic ultrasound medical image, more specifically, an image in which the polyp suspected region is cropped may be used.

According to a feature of the present disclosure, while determining the pathogenesis of the gallbladder polyp, an ROI for the first assessment model may also be displayed and output on the ultrasound medical image.

For example, referring to FIG. 2B, an endoscopic ultrasound medical image 312 received by the receiving of the ultrasound medical image at step S210 is cropped to include an ROI of a polyp suspected region 3141. As a result, a cropped endoscopic ultrasound medical image 314 is acquired, and the cropped endoscopic ultrasound medical image 314 is input to a first assessment model 320. At this time, the first assessment model 320 may provide an ultrasound medical image 322 displayed with an ROI, which is a region of high interest in classifying gallbladder polyps or gallbladder stones. For example, a class activation map (CAM) in which a feature map of a last layer for the first assessment model 320 is visualized may be provided. Accordingly, it may be easy to identify a lesion region suspected of gallbladder polyps or gallbladder stones. As the result of determining the pathogenesis of the gallbladder polyp at step S220, the polyp suspected region 3141 of the cropped endoscopic ultrasound medical image 314 may be classified into gallbladder stones 324 or gallbladder polyps 326. Meanwhile, in the case of a normal subject, the determination of the ROI, which is a region suspected of a lesion, may not occur by the first assessment model 320. Accordingly, the first assessment model 320 may be able to determine a normal subject.

Referring back to FIG. 2A, in the determining of the characteristics of the gallbladder polyp at step S230, the gallbladder polyp may be classified as a non-neoplastic GB polyp or a neoplastic GB polyp by the second assessment model.

For example, referring back to FIG. 2B, as the result of determining the pathogenesis of the gallbladder polyp at step S220, when the polyp suspected region 3141 is determined as the gallbladder polyp 326, the cropped endoscopic ultrasound medical image 314 is again input to the second assessment model 330. At this time, the second assessment model 330 may be a model configured to classify non-neoplastic GB polyps or neoplastic GB polyps with respect to the gallbladder polyp region. The second assessment model 330 may be further configured to provide an ultrasound medical image 332 displayed with an ROI, which is a region with high interest or contribution in the process of classifying the neoplastic GB polyps or the non-neoplastic GB polyps. For example, a CAM in which the feature map of the last layer for the second assessment model 330 is visualized may be provided. Accordingly, it may be easy to identify a lesion region suspected of neoplastic GB polyps or non-neoplastic GB polyps. As the result of determining the characteristics of the gallbladder polyp at step S230, the polyp suspected region 3141 of the cropped endoscopic ultrasound medical image 314 may be classified into non-neoplastic GB polyps 334 or neoplastic GB polyps 336.

According to another feature of the present disclosure, after the determining of the characteristics of the gallbladder polyp at step S230, when the neoplastic GB polyp is determined, a step of classifying a malignant neoplastic GB polyp or a benign neoplastic GB polyp by a third assessment model configured to classify the malignant neoplastic GB polyp or the benign neoplastic GB polyp with respect to the neoplastic GB polyp region may be further performed.

For example, referring back to FIG. 2B, as the result of determining the characteristics of the gallbladder polyp at step S230, when the polyp suspected region 3141 is determined as the neoplastic GB polyp 336, the cropped endoscopic ultrasound medical image 314 is again input to the third assessment model 340. At this time, the third assessment model 340 may be a model configured to classify adenomatous GB polyps or adenocarcinoma GB polyps with respect to the gallbladder polyp region. The third assessment model 340 may be further configured to provide an ultrasound medical image 342 displayed with an ROI, which is a region with high interest or contribution in the process of classifying the adenomatous GB polyps or the adenocarcinoma GB polyps. For example, a CAM in which the feature map of the last layer for the third assessment model 340 is visualized may be provided. Accordingly, it may be easy to identify a lesion region suspected of the adenomatous GB polyp or adenocarcinoma GB polyp. As the result of classifying the malignant neoplastic GB polyp or the benign neoplastic GB polyp, the polyp suspected region 3141 of the cropped endoscopic ultrasound medical image 314 may be classified into an adenomatous polyp 344 or an adenocarcinoma polyp 346.

Referring back to FIG. 2A, in the providing of the diagnosis result at step S240, the risk may be provided probabilistically whether the subject is normal, or whether there is the risk of the pathogenesis of gallbladder stones, gallbladder polyps, neoplastic gallbladder polyps, non-neoplastic GB polyps, adenomatous GB polyps, or adenocarcinoma GB polyps. Furthermore, the suspected region may be displayed and provided in the endoscopic ultrasound medical image, and the size of the gallbladder polyp may also be displayed and provided.

According to the method for providing the information about the diagnosis of the gallbladder polyp according to various exemplary embodiments, a system for diagnosing a gallbladder polyp that can be visually explained may be provided. Therefore, the present disclosure may provide the system for diagnosing the gallbladder polyp to prevent the medical staffs from misinterpreting the diagnosis of the gallbladder polyp due to inaccurate measurement, and improve a workflow of the medical staff in the actual clinical practice. Furthermore, since the medical staffs may quickly select an appropriate treatment method according to the assessment result, the system for diagnosing the gallbladder polyp according to the present disclosure has an effect of contributing to early treatment and good treatment prognosis.

Meanwhile, the system for diagnosing the gallbladder polyp may receive the endoscopic ultrasound medical image from an image diagnosis device such as an endoscopic ultrasound and simultaneously predict a lesion. That is, the system for diagnosing the gallbladder polyp may provide a streaming service and provide diagnosis information of the gallbladder polyp in real time.

Hereinafter, referring to FIGS. 3A and 3B, a step of cropping the ROI used in the first assessment model, the second assessment model, and the third assessment model used in various exemplary embodiments of the present disclosure will be described in detail. FIGS. 3A and 3B are diagrams exemplarily illustrating a process of cropping an ROI according to a method for providing information about the diagnosis of a gallbladder polyp according to an exemplary embodiment of the present disclosure.

In this case, when the ultrasound medical image is an endoscopic ultrasound medical image, since it is difficult to check the size of a pixel, according to an exemplary embodiment of the present disclosure, it is possible to check the size per pixel and set a target size based on a scale bar including scales in the endoscopic ultrasound medical image.

Referring to FIG. 3A, for ROI cropping, first, a size per pixel is calculated based on a scale bar at step S310, a target size is determined based on the size per pixel at step S320, and an ROI is cropped based on the target size at step S330.

More specifically, referring to FIG. 3B, a scale bar 352 may be displayed on the endoscopic ultrasound medical image 312. At this time, the scale bar 352 displays a plurality of scales, and a scale of a column may be 0.5 cm. Accordingly, it is possible to estimate the actual size (mm) per pixel by counting the number of pixels on an x-axis (horizontal axis) between scales.

According to a feature of the present disclosure, in the calculating of the size per pixel based on the scale bar at step S310, an x-axial coordinate value for each of two scales selected from the scale bar of the ultrasound medical image is determined, and a pixel distance between the scales is calculated based on the x-axial coordinate. Then, the size per pixel may be calculated based on the pixel distance and the predetermined size for the scale.

For example, if two scales in the scale bar are sequentially clicked in the endoscopic ultrasound medical image, coordinate values (x-axial value and y-axial value) of the clicked position may be acquired. Then, the pixel distance between the two scales may be determined based on a difference between the x-axial values. Thereafter, the size per pixel may be determined based on the scale of the column of 0.5 cm and the determined pixel distance.

That is, the size per pixel may be determined based on the position on the two scales determined by a manual method.

According to another feature of the present disclosure, in the calculating of the size per pixel based on the scale bar at step S310, the scale bar is cropped in the endoscopic ultrasound medical image, and a position of the scale is determined based on the scales of the cropped scale bar by a connected component algorithm. Then, the size per pixel may be calculated based on the position of the scale and the predetermined size for the scale.

For example, in the endoscopic ultrasound medical image, the scales may be located in a specific area with only a difference in the distance between the scales. Accordingly, a part of the region where the scales are located in the ultrasound medical image may be cropped, and the connected component algorithm may be applied to pixels having a specific pixel value or more. As a result, the position of the scale may be automatically determined based on the size and position information of detected objects. Then, the size per pixel may be calculated based on the position of the scale and the predetermined size for the scale.

That is, the size per pixel may be determined based on the position on the two scales determined by an automatic method.

Next, in the determining of the target size at step S320, the size of the ROI may be determined. For example, the size of the ROI may be 20×20 mm to reflect the size of the polyp. That is, in the calculating of the size per pixel based on the scale bar at step S310, through the actual size per pixel calculated manually or automatically, the number of pixels corresponding to 20 mm may be calculated inversely.

Finally, in the cropping of the ROI based on the target size at step S330, a region corresponding to the target size, for example, 20×20 mm may be cropped.

The ROI cropped based on actual measurement information may be input to the first assessment model, the second assessment model, or the third assessment model, and size information of a suspected lesion in classification may be used. Furthermore, the type of lesion may be classified with high accuracy for small-sized polyps.

Figure 4:
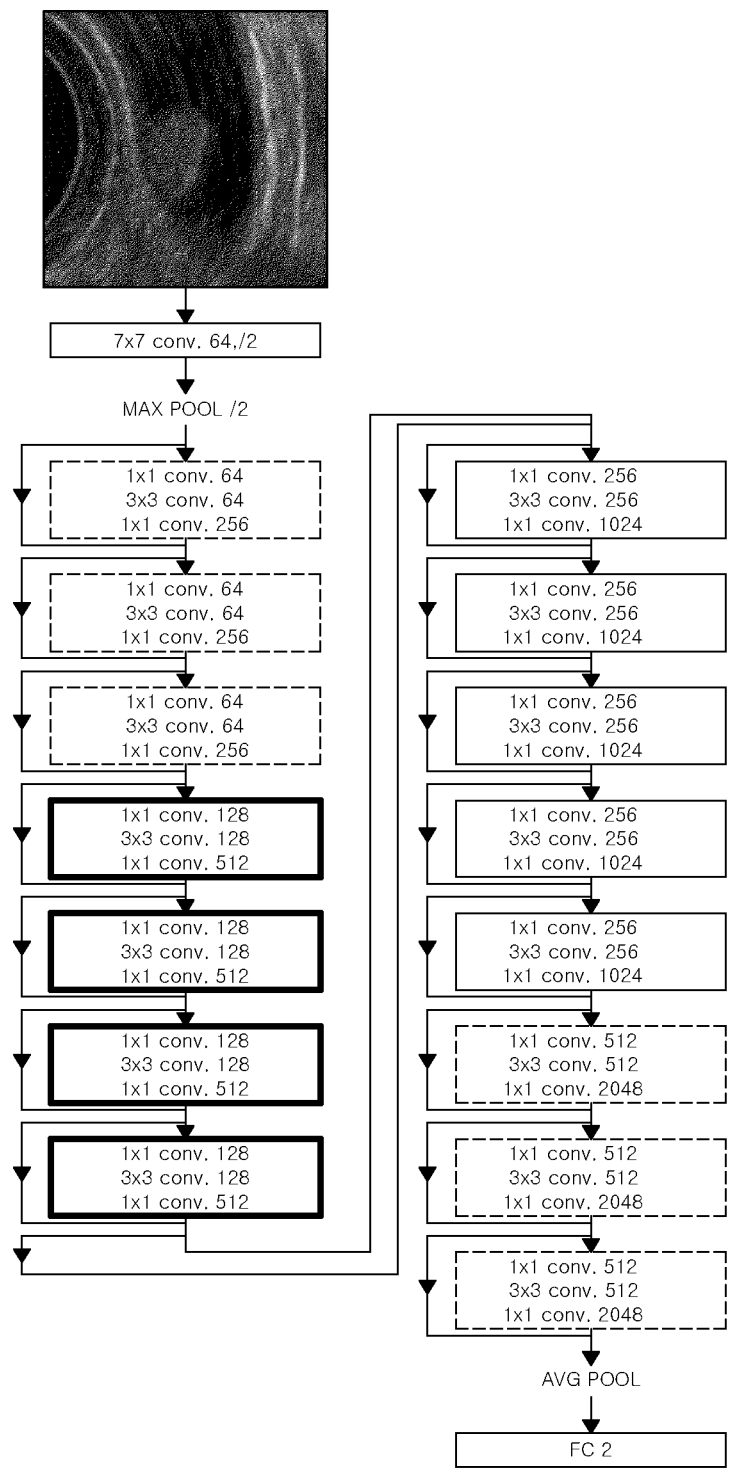
FIG. 4 is a diagram exemplarily illustrating a structure of an assessment model used in various exemplary embodiments of the present disclosure.

Hereinafter, a structure of an assessment model applied to various exemplary embodiments of the present disclosure will be described with reference to FIG. 4. FIG. 4 is a diagram exemplarily illustrating structures of assessment models used in various exemplary embodiments of the present disclosure.

In this case, a first assessment model, a second assessment model, and a third assessment model used in various exemplary embodiments of the present disclosure may be based on Resnet50. More specifically, the assessment models based on Resnet50 may consist of a plurality of convolution layers, a max pooling layer that extracts a local maximum value to be used as a feature, an average pooling layer, and a fully connected (FC) layer for lesion classification.

More specifically, when the ultrasound medical image is input to the assessment models, by a multi-layered neural network structure, each assessment model may be configured to classify a lesion into 2 classes of gallbladder stones or gallbladder polyps, neoplastic GB polyps or non-neoplastic GB polyps, and adenocarcinoma GB polyps or adenomatous GB polyps. However, the present disclosure is not limited thereto, and the first assessment model may also classify a normal.

At this time, the assessment models may be further configured to provide a class activation map (CAM) in which a feature map of the last layer is visualized. Accordingly, it may be easy to identify a region suspected of a lesion region.

For example, the CAM may include a main ROI with high interest determined by the assessment models, and the main ROI may be normalized to have a value of 0 to 1 according to a degree.

Meanwhile, hyperparameters for training the assessment models may be set to a batch size of 40, an epoch of 300, and a learning rate of 0.0001, but the values of the parameters are not limited thereto.

Furthermore, the assessment models may be based on a fully convolutional network (FCN) having VGG net, R, DenseNet, and an encoder-decoder structure, a deep neural network (DNN) such as SegNet, DeconvNet, DeepLAB V3+, and U-net, and at least one algorithm selected from SqueezeNet, Alexnet, ResNet18, MobileNet-v2, GoogLeNet, Resnet-v2, Resnet50, Resnet101, and Inception-v3. In addition, the assessment models may be ensemble models based on at least two algorithm models among the aforementioned algorithms.

Figure 5D:
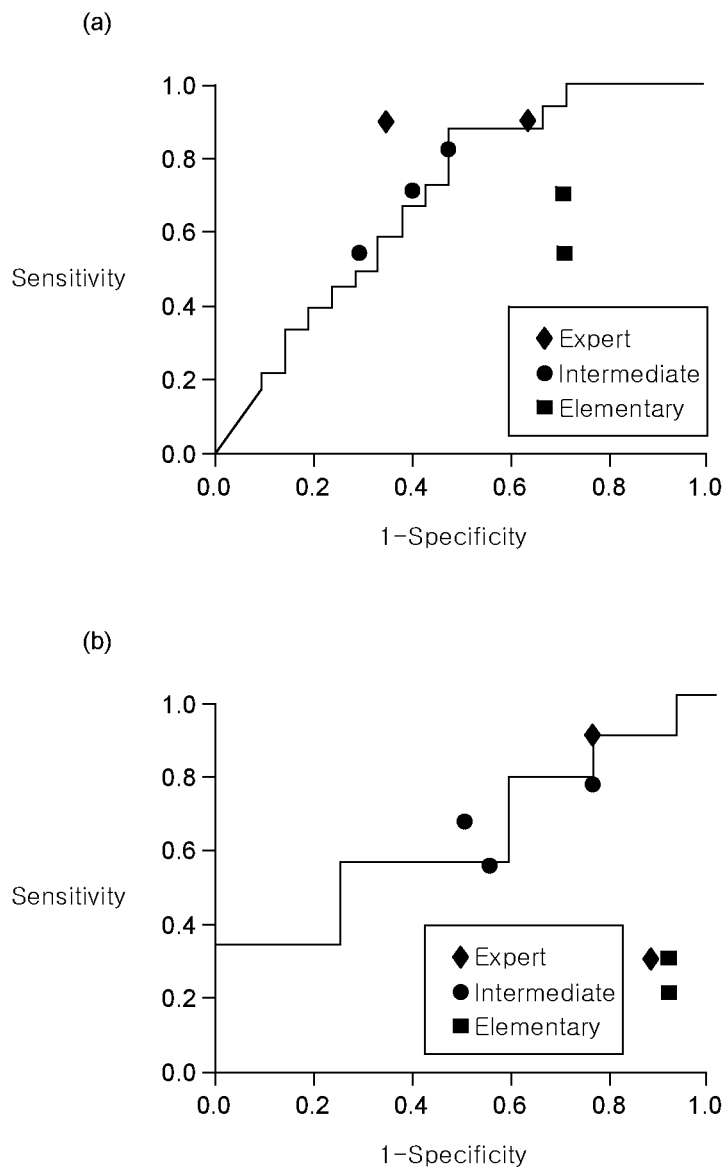

Assessment: Assessment of First Assessment Model, Second Assessment Model, and Third Assessment Model Used in Various Exemplary Embodiments of the Present Disclosure Hereinafter, referring to FIGS. 5A to 5E, training data and assessment results of a first assessment model, a second assessment model, and a third assessment model according to various exemplary embodiments of the present disclosure will be described. FIG. 5A is a diagram illustrating training of assessment models and assessment data used in various exemplary embodiments of the present disclosure. FIGS. 5B to 5E are diagrams illustrating assessment results of the assessment models used in various exemplary embodiments of the present disclosure.

At this time, the first assessment model has been trained to distinguish gallbladder polyps and gallbladder stones with respect to a polyp suspected region, but is not limited thereto and can be assessed as 'normal.'

First, referring to FIG. 5A, 1039 images acquired from 670 patients were used as a training data set to construct an assessment model. More specifically, the training data set consists of 145 endoscopic ultrasound images acquired from a subject with neoplastic GB polyps, 691 endoscopic ultrasound images acquired from a subject with non-neoplastic GB polyps, and 203 endoscopic ultrasound images acquired from a subject with gallbladder stones. In this case, the subject with the neoplastic GB polyps may consist of a subject with adenocarcinoma GB polyps and a subject with adenomatous GB polyps, and the subject with the non-neoplastic GB polyps may consist of a subject with cholesterol GB polyps and a subject with adenomyomatosis.

In addition, for validation of the assessment model, 83 images acquired from 83 patients were used as a validation data set. More specifically, the validation data set consists of 20 endoscopic ultrasound images acquired from a subject with neoplastic GB polyps, 52 endoscopic ultrasound images acquired from a subject with non-neoplastic GB polyps, and 11 endoscopic ultrasound images acquired from a subject with gallbladder stones. In this case, the subject with the neoplastic GB polyps may consist of a subject with adenocarcinoma GB polyps and a subject with adenomatous GB polyps, and the subject with the non-neoplastic GB polyps may consist of a subject with cholesterol GB polyps and a subject with adenomyomatosis.

Referring to the assessment results of FIG. 5B, the first assessment model trained to classify gallbladder polyps and gallbladder stones has the sensitivity of 96.3%, the specificity of 92.9% and the accuracy of 95.7% in the classification. Moreover, a positive predictive value (PPV) is 98.4% and a negative predictive value (NPV) is 79.5%, and particularly, an area under curve (AUC) value associated with diagnostic ability is 0.99, which is very high. These results may mean that the first assessment model classifies gallbladder polyps and gallbladder stones with high accuracy, and the classification result has high reliability.

In addition, a second assessment model trained to classify non-neoplastic GB polyps and neoplastic GB polyps with respect to gallbladder polyps has the sensitivity of 77.8%, the specificity of 91.6%, and the accuracy of 89.8%. Moreover, the NPV is 96.5%, and the AUC value associated with the diagnostic ability is 0.891, which is a high level. These results may mean that the second assessment model classifies non-neoplastic GB polyps and neoplastic GB polyps with high accuracy, and the classification result has high reliability.

Furthermore, a third assessment model trained to classify adenocarcinoma GB polyps and adenomatous GB polyps with respect to the neoplastic GB polyps has the classification sensitivity of 85.6% and the accuracy of 82.1%. Moreover, the PPV is 87.4%, and the AUC value associated with the diagnostic ability is 0.910, which is a very high level. These results may mean that the third assessment model classifies adenocarcinoma GB polyps and adenomatous GB polyps with high accuracy, and the classification result has high reliability.

Next, referring to FIG. 5C, lesion classification results for expert, intermediate, and beginner medical personnel are compared and illustrated with each of the assessment models used in the gallbladder polyp diagnosis system according to various exemplary embodiments.

More specifically, the classification for gallbladder stones and gallbladder polyps in the first assessment model had the sensitivity of 98.4% and the accuracy of 84.6%, which were higher than the classification results of gallbladder stones and gallbladder polyps by the overall medical staffs having the sensitivity of 90.9%.

In the case of the second assessment model, the classification for non-neoplastic GB polyps and neoplastic GB polyps had the specificity of 77.4% and the accuracy of 74.4%, which were higher than the classification results of non-neoplastic GB polyps and neoplastic GB polyps by the overall medical staffs having the specificity of 44.9% and the accuracy of 65.3%. In particular, the second assessment model had a similar level of classification accuracy as compared to expert-level medical personnel.

In the case of the third assessment model, the classification for adenomatous GB polyps and adenocarcinoma GB polyps of the neoplastic GB polyps had the sensitivity of 65.3%, the specificity of 60.6% and the accuracy of 63.8%. The results were higher than the classification results of adenomatous GB polyps and adenocarcinoma GB polyps by the expert-level medical staff having the sensitivity of 61.1%, the specificity of 20.9% and the accuracy of 38.1%.

These results may mean that, in particular, the diagnostic performance of the third assessment model in classifying the adenomatous GB polyps and the adenocarcinoma GB polyps is higher than that of the expert-level medical personnel.

Referring further to FIG. 5D (a), an ROC curve with a solid line for classification of neoplastic GB polyps and non-neoplastic GB polyps of the second assessment model according to an exemplary embodiment of the present disclosure and the diagnosis results by expert, intermediate and elementary medical staffs are illustrated. More specifically, the diagnosis ability of the second assessment model is significantly higher than that of the elementary-level medical staff with relatively little experience.

Referring to FIG. 5D (b), an ROC curve with a solid line for classification of adenomatous GB polyps and adenocarcinoma GB polyps of the third assessment model according to an exemplary embodiment of the present disclosure, and the diagnosis results by expert, intermediate and elementary medical staffs are illustrated. More specifically, the third assessment model had significantly higher diagnostic ability than the expert.

According to the above results, it is shown that a gallbladder polyp assessment system based on a plurality of assessment models may have the diagnostic ability similar to that of an expert-level medical staff.

That is, the system for diagnosing the gallbladder polyp based on a deep learning model can objectively analyze an endoscopic ultrasound medical image regardless of the skill level of medical personnel.

Accordingly, the present disclosure may provide a polyp diagnosis system based on the deep learning model to prevent medical staffs from misinterpreting the progress of gallbladder polyps due to inaccurate images and improve a workflow of medical staffs in an actual clinical practice.

Figure 5E:
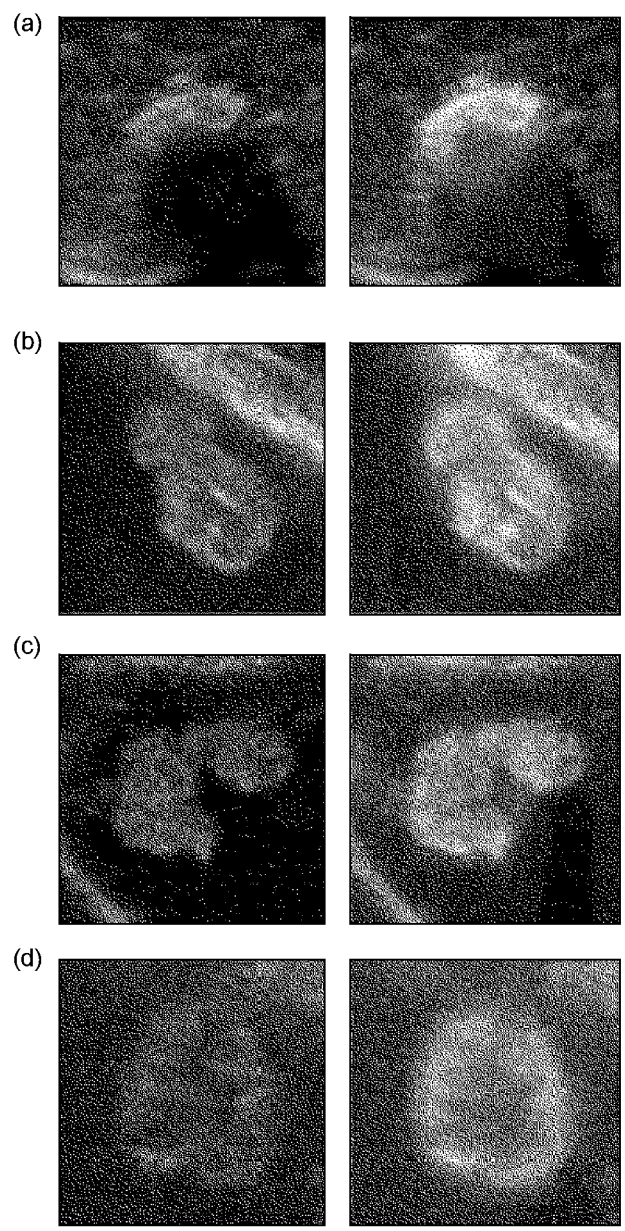

Next, referring to FIG. 5E, in the classification process of the first assessment model, the second assessment model, and the third assessment model, a CAM image showing a region with high contribution to classification is illustrated.

More specifically, referring to FIG. 5E (a), according to the CAM analysis results for the region determined as gallbladder stones by the first assessment model used in various exemplary embodiments of the present disclosure, it is shown that the interest in a specific region is high. Furthermore, referring to FIG. 5E (b), according to the CAM analysis results for the region determined as gallbladder polyps by the first assessment model used in various exemplary embodiments of the present disclosure, it is shown that the interest in a specific polyp region is high. In addition, referring to FIG. 5E (c), according to the CAM analysis results for the region determined as non-neoplastic GB polyps by the second assessment model used in various exemplary embodiments of the present disclosure, it is shown that the interest in a specific polyp region is high. In addition, referring to FIG. 5E (d), according to the CAM analysis results for the region determined as neoplastic GB polyps by the second assessment model used in various exemplary embodiments of the present disclosure, it is shown that the interest in a specific polyp region is high.

As such, the assessment models may be further configured to provide a CAM in which the feature map of the last layer is visualized, so that the medical staffs can confirm a region suspected of a lesion region.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be appreciated that the aforementioned exemplary embodiments are illustrative in all aspects and are not restricted. The protective scope of the present disclosure should be construed on the basis of the appended claims, and all the technical spirits in the equivalent scope thereof should be construed as falling within the scope of the present disclosure.

EXPLANATION OF REFERENCE NUMERALS AND SYMBOLS

100: Device for providing information about diagnosis of gallbladder polyp
110, 230: Storage unit
120, 210: Communication unit
130, 240: Processor
200: Medical staff device
220: Display unit
300: Endoscopic ultrasound diagnostic device
312: Endoscopic ultrasound medical image
314: Cropped endoscopic ultrasound medical image
3141: Polyp suspected region
320: First assessment model
322, 332, 334: Ultrasound medical image displayed with ROI
324: Gallbladder stones
326: Gallbladder polyps
330: Second assessment model
334: Non-neoplastic GB polyps
336: Neoplastic GB polyps
340: Third assessment model
344: Adenomatous GB polyps
346: Adenocarcinoma GB polyps
352: Scale bar
[National research and development project supporting the invention]
[Project Unique Number] 1711093134
[Project Number] IITP-2020-2017-0-01630
[Ministry name] Ministry of Science and ICT
[Project Management (Special) Institution Name] Institute of Information & Communications Technology Planning & Evaluation (IITP)
[Research Project Name] University ICT Research Center Promotion Support Project
[Research Subject Name] Development of brain disease prediction and prevention technology using medical big data and professional manpower training
[Percent Contribution] 1/1
[Project performance institute name] Gachon University of Industry-Academic Cooperation Foundation
[Research Period] 2019.01.01~2019.12.31

What is claimed is:

1. A method for providing information about the diagnosis of a gallbladder polyp implemented by a processor, the method comprising:
    receiving an ultrasound medical image including a scale bar and a gallbladder part of a subject;
    determining a region of interest (ROI) with respect to the ultrasound medical image;
    cropping the ROI at a predetermined level based on the scale bar;

determining pathogenesis of a gallbladder polyp (GB) in the subject using a first assessment model configured to determine the pathogenesis of the gallbladder polyp based on the ROI of the ultrasound medical image; and determining characteristics of the gallbladder polyp based on a second assessment model configured to classify characteristics of the gallbladder polyp, when the pathogenesis of the gallbladder polyp is determined in the ultrasound medical image.

2. The method of claim 1, wherein the determining of the pathogenesis of the gallbladder polyp of the subject comprises determining gallbladder polyps or gallbladder stones using the first assessment model trained to classify the gallbladder polyps or the gallbladder stones based on the ultrasound medical image.

3. The method of claim 2, wherein the determining of the characteristics of the gallbladder polyp comprises determining non-neoplastic GB polyps or neoplastic GB polyps using the second assessment model configured to classify the non-neoplastic GB polyps or the neoplastic GB polyps in a gallbladder polyp region.

4. The method of claim 3, further comprising:

after the determining the characteristics of the gallbladder polyp, determining adenocarcinoma GB polyps or adenomatous GB polyps using a third assessment model configured to classify the adenocarcinoma GB polyps or the adenomatous GB polyps in the neoplastic GB polyp region, when the neoplastic GB polyps is determined.

5. The method of claim 1, wherein the cropping at the predetermined level comprises:

calculating a size per pixel based on the scale bar;
determining a target size based on the size per pixel; and
cropping the ROI based on the target size.

6. The method of claim 5, wherein
the scale bar includes scales having a predetermined size, and
the calculating of the size per pixel comprises:
determining an x-axial coordinate value for each of two scales selected from the scale bar of the ultrasound medical image;
calculating a pixel distance based on the x-axial coordinate; and
calculating the size per pixel based on the pixel distance and the predetermined size.

7. The method of claim 5, wherein
the scale bar includes scales having a predetermined size, and
the calculating of the size per pixel comprises:
cropping the scale bar in the ultrasound medical image;
determining a position of a scale of the ultrasound medical image based on the scales of the cropped scale bar using a connected component algorithm; and
calculating the size per pixel based on the position of the scale and the predetermined size.

8. The method of claim 1, wherein the ultrasound medical image is an endoscopic ultrasound (EUS) medical image.

9. The method of claim 1, further comprising:
displaying and providing an ROI for the first assessment model on the ultrasound medical image while determining the pathogenesis of the gallbladder polyp, or
displaying and providing an ROI for the second assessment model on the ultrasound medical image while classifying the characteristics of the gallbladder polyp.

10. A device for providing information about the diagnosis of a gallbladder polyp, the device comprising:

a transceiver configured to receive an ultrasound medical image including a scale bar and a gallbladder part of a subject; and a processor coupled with the transceiver and configured to
determine a region of interest (ROI) with respect to the ultrasound medical image,
crop the ROI at a predetermined level based on the scale bar,
determine the pathogenesis of a gallbladder polyp (GB) in the subject using a first assessment model configured to determine the pathogenesis of the gallbladder polyp based on the ROI of the ultrasound medical image, and
determine characteristics of the gallbladder polyp based on a second assessment model configured to classify the characteristics of the gallbladder polyp, when the gallbladder polyp is determined in the ultrasound medical image.

11. The device of claim 10, wherein the processor is further configured to determine gallbladder polyps or gallbladder stones, using the first assessment model further trained to classify the gallbladder polyps or the gallbladder stones based on the ultrasound medical image.

12. The device of claim 11, wherein the processor is further configured to determine non-neoplastic GB polyps or neoplastic GB polyps, using the second assessment model configured to classify the non-neoplastic GB polyps or the neoplastic GB polyps in a gallbladder polyp region.

13. The device of claim 12, wherein the processor is further configured to determine adenocarcinoma GB polyps or adenomatous GB polyps, using a third assessment model configured to classify the adenocarcinoma GB polyps or the adenomatous GB polyps in the neoplastic GB polyp region, when the neoplastic GB polyps are determined.

14. The device of claim 10, wherein the processor is further configured to
calculate a size per pixel based on the scale bar,
determine a target size based on the size per pixel, and
crop the ROI based on the target size.

15. The device of claim 14, wherein
the scale bar includes scales having a predetermined size, and
the processor is further configured to
determine an x-axial coordinate value for each of two scales selected from the scale bar of the ultrasound medical image,
calculate a pixel distance based on the x-axial coordinate, and
calculate the size per pixel based on the pixel distance and the predetermined size.

16. The device of claim 14, wherein
the scale bar includes scales having a predetermined size, and
the processor is further configured to
crop the scale bar in the ultrasound medical image,
determine a position of a scale of the ultrasound medical image based on the scales of the cropped scale bar, using a connected component algorithm, and
calculate the size per pixel based on the position of the scale and the predetermined size.

17. The device of claim 10, wherein the ultrasound medical image is an endoscopic ultrasound (EUS) medical image.

18. The device of claim 12, wherein the is further configured to
   display and provide an ROI for the first assessment model on the ultrasound medical image while determining the pathogenesis of the gallbladder polyp, or
   display and provide an ROI for the second assessment model on the ultrasound medical image while classifying the characteristics of the gallbladder polyp.

\* \* \* \* \*